United States Patent
Firstenberg et al.

(10) Patent No.: US 10,425,436 B2
(45) Date of Patent: Sep. 24, 2019

(54) IDENTIFYING BULLETPROOF AUTONOMOUS SYSTEMS

(71) Applicant: Palo Alto Networks (Israel Analytics) Ltd, Tel Aviv (IL)

(72) Inventors: Eyal Firstenberg, Ramat HaSharon (IL); Yinnon Meshi, Kibbutz Revivim (IL); Idan Amit, Ramat Gan (IL); Jonathan Allon, Haifa (IL); Keren Mizinski, Be'er Sheva (IL)

(73) Assignee: Palo Alto Networks (Israel Analytics) Ltd., Tel Aviv (IL)

( * ) Notice: Subject to any disclaimer, the term of this patent is extended or adjusted under 35 U.S.C. 154(b) by 169 days.

(21) Appl. No.: 15/694,892

(22) Filed: Sep. 4, 2017

(65) Prior Publication Data

US 2018/0069884 A1   Mar. 8, 2018

Related U.S. Application Data

(60) Provisional application No. 62/383,436, filed on Sep. 4, 2016.

(51) Int. Cl.
*H04L 29/06* (2006.01)
*H04L 12/26* (2006.01)
*G06N 5/02* (2006.01)

(52) U.S. Cl.
CPC ........... *H04L 63/1425* (2013.01); *G06N 5/02* (2013.01); *H04L 43/04* (2013.01); *H04L 43/12* (2013.01); *H04L 43/16* (2013.01)

(58) Field of Classification Search
CPC ..... H04L 63/1425; H04L 43/12; H04L 43/16; H04L 43/04; G06N 5/02
See application file for complete search history.

(56) References Cited

U.S. PATENT DOCUMENTS 8,245,304 B1 * 8/2012 Chen ................. G06F 21/51
                                                    370/233
8,555,388 B1  10/2013  Wang et al.
(Continued)

OTHER PUBLICATIONS

Wei et al., "Identifying New Spam Domains by Hosting IPS: Improving Domain Blacklisting", Dept. of Computer and Information Sciences, University of Alabama at Birmingham, 8 pages, Jan. 2010.
Iana., "Autonomous System (AS) Numbers", 1 page, Jul. 29, 2016.
Gross et al., "FIRE: FInding Rogue nEtworks", Annual Conference on Computer Security Applications, 10 pages, Dec. 7-11, 2009.
(Continued)

*Primary Examiner* — Brandon S Hoffman
*Assistant Examiner* — William A Corum, Jr.
(74) *Attorney, Agent, or Firm* — Kligler & Associates

(57) ABSTRACT

A method, including collecting data transmitted from endpoints to Internet sites having respective domains and respective IP addresses, and transmissions to IP addresses of ASN numbers or ASN names included in a list of ASNs. An ASN data traffic model is generated by modeling, for each given ASN, data transmitted to any of the IP address of the given ASN based on the data, and for each given ASN and a set of keywords, multiple web searches are performed, each of the web searches including a given keyword and an ASN name or a number for the given ASN. Based on the web searches, a model of relationships between the keywords and the ASNs is generated, and one or more of the ASNs are predicted to be suspicious based on their respective modeled data transmissions and their respective modeled relationships between the keywords and the one or more ASNs.

25 Claims, 5 Drawing Sheets

(56) References Cited

U.S. PATENT DOCUMENTS

| | | | |
|---|---|---|---|
| 8,677,487 B2 | 3/2014 | Balupari et al. | |
| 8,966,625 B1 | 2/2015 | Zuk et al. | |
| 9,038,178 B1 | 5/2015 | Lin et al. | |
| 9,147,071 B2 | 9/2015 | Sallam | |
| 9,215,239 B1 | 12/2015 | Wang et al. | |
| 9,342,691 B2 | 5/2016 | Maestas | |
| 9,378,361 B1 | 6/2016 | Yen et al. | |
| 9,386,028 B2 | 7/2016 | Altman | |
| 10,148,690 B2 * | 12/2018 | Shen | H04L 63/1408 |
| 2008/0256622 A1 * | 10/2008 | Neystadt | H04L 63/1416 726/14 |
| 2011/0283357 A1 | 11/2011 | Pandrangi et al. | |
| 2012/0158626 A1 * | 6/2012 | Zhu | G06F 21/56 706/13 |
| 2014/0007238 A1 * | 1/2014 | Magee | G06F 21/577 726/24 |
| 2014/0165207 A1 | 6/2014 | Engel et al. | |
| 2015/0172300 A1 | 6/2015 | Cochenour | |
| 2015/0358344 A1 | 12/2015 | Mumcuoglu et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0134651 A1 | 5/2016 | Hu et al. | |
| 2016/0150004 A1 * | 5/2016 | Hentunen | H04L 67/1036 726/23 |
| 2016/0156655 A1 | 6/2016 | Lotem et al. | |
| 2016/0234167 A1 | 8/2016 | Engel et al. | |
| 2016/0352772 A1 * | 12/2016 | O'Connor | H04L 63/1483 |
| 2017/0026398 A1 | 1/2017 | Mumcuoglu et al. | |
| 2017/0041333 A1 * | 2/2017 | Mahjoub | H04L 61/1511 |
| 2018/0288073 A1 * | 10/2018 | Hopper | H04L 63/1425 |
| 2019/0007440 A1 * | 1/2019 | Lavi | H04L 63/0227 |

OTHER PUBLICATIONS

Frosch., "Mining DNS-related Data for Suspicious Features", Ruhr Universitat Bochum, Master's Thesis, 88 pages, Dec. 23, 2011.

Bilge et al., "Disclosure: Detecting Botnet Command and Control Servers Through Large-Scale NetFlow Analysis", Annual Conference on Computer Security Applications, 10 pages, Dec. 3-7, 2012.

Blum., "Combining Labeled and Unlabeled Data with Co-Training", Carnegie Mellon University, Research Showcase @ CMU, Computer Science Department, 11 pages, Jul. 1998.

Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.

Konte et al., "ASwatch: An AS Reputation System to Expose Bulletproof Hosting ASes", SIGCOMM, pp. 625-638, Aug. 17-21, 2015.

Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.

Goncharov,M., "Criminal Hideouts for Lease: Bulletproof Hosting Services", Forward-Looking Threat Research (FTR) Team, A TrendLabsSM Research Paper, 28 pages, Jul. 3, 2015.

Bilge at al., "Exposure: Finding Malicious Domains Using Passive DNS Analysis", NDSS Symposium, 17 pages, Feb. 6-9, 2011.

Meshi et al., U.S. Appl. No. 15/694,890, filed Sep. 4, 2017.

U.S. Appl. No. 15/694,890 office action dated May 20, 2019.

\* cited by examiner

IDENTIFYING BULLETPROOF AUTONOMOUS SYSTEMS

CROSS-REFERENCE TO RELATED APPLICATIONS

This application claims the benefit of U.S. Provisional Patent Application 62/383,436, filed Sep. 4, 2016, which is incorporated herein by reference. This application is also related to U.S. Patent Applications titled "Detection of Known and Unknown Malicious Domains" filed on even date with the present application, which is also incorporated herein by reference.

FIELD OF THE INVENTION

The present invention relates generally to computer systems and networks, and particularly to apparatus, method and software for identifying bulletproof autonomous systems accessed by computers on a network.

BACKGROUND OF THE INVENTION

In many computer and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to prevent malware from spreading through the network.

In this latter category, for example, U.S. Patent Application 2014/0165207 to Engel et al. describes a method and system for detecting anomalous action within a computer network. The method starts with collecting raw data from at least one probe sensor that is associated with at least one router, switch or server in the computer network. The raw data is parsed and analyzed to create meta-data from the raw data, and computer network actions are identified based on knowledge of network protocols. The meta-data or a higher level aggregation is associated with entities by analyzing and correlating between the identified network actions. A statistical model of the computer network is created, for detection of anomalous network actions associated with the entities.

As another example, U.S. Patent Application 2015/0358344 to Mumcuoglu et al. describes a method for computer system forensics that includes receiving an identification of at least one host computer that has exhibited an anomalous behavior, in a computer network comprising multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including collecting information on data transmitted from multiple endpoints to multiple Internet sites having respective domains and respective Internet Protocol (IP) addresses, identifying, in the collected information, transmissions to IP addresses of autonomous system numbers (ASNs) or ASN names included in a list of ASNs, generating an ASN data traffic model by modeling, for each given ASN, data transmitted to any of the IP address of the given ASN based on the collected information, for each given ASN, performing, using a specified set of indicative keywords, a set of web searches, each of the web searches including a given indicative keyword and an ASN name or a number for the given ASN, generating, based on the web searches, a web search model of relationships between the indicative keywords and the ASNs, and predicting one or more of the ASNs to be suspicious based on their respective modeled data transmissions and their respective modeled relationships between the indicative keywords and the one or more ASNs.

In some embodiments, the method may include generating an alert for the one or more predicted ASNs, or for transmissions to the IP addresses of the one or more predicted ASNs. In one embodiment, generating the alert may include restricting data transmissions between the endpoints and the IP addresses of the one or more predicted ASNs. In another embodiment, each given predicted ASN may include a rentable ASN or a bulletproof ASN.

In additional embodiments, predicting a given ASN to be suspicious may include calculating a score based on the modeled data traffic exchanged with the given ASN and the relationship between the indicative keywords and the given ASN, and detecting that the score is greater than a specified score threshold. In further embodiments, predicting the one or more ASNs to be suspicious may include identifying a plurality of the ASNs based on the modeled data transmitted to the ASNs, and predicting, from the identified plurality of the ASNs, the one or more ASNs based on their respective generated model of relationship.

In supplemental embodiments, predicting the one or more ASNs to be suspicious may include identifying a plurality of the ASNs based on their respective generated model of relationship, and predicting, from the identified plurality of the ASNs, the one or more ASNs based on the modeled data transmitted to the ASNs. In some embodiments, the data traffic model may include a data traffic sub-model, wherein the web search model may include a web search sub-model, and the method may include generating, using the sub-models, a suspicious ASN detection model, and wherein predicting one or more of the ASNs to be suspicious may include applying the ASN detection model to the data transmission and the web searches.

In one embodiment, generating the suspicious ASN detection model may include co-training the sub-models. In another embodiment, the method may include generating one or more additional sub-models based on respective features, wherein the suspicious ASN detection model includes the additional sub-models. In an additional embodiment, generating the suspicious ASN detection model may include co-training the sub-models.

In further embodiments, each of the one or more additional sub-models are selected from a group consisting of a first additional sub-model that analyzes respective reputations of the domains, a second additional sub-model that compares the domains to a blacklist, a third additional sub-model that uses threat intelligence data to analyze the domains, a fourth additional sub-model that analyzes a number of ASNs associated with each of the domains, a fifth additional sub-model that analyzes ASN names of the ASNs associated with the domains, a sixth additional sub-model for DCMA violation domains, a seventh additional sub-model for adult site domains, an eighth additional sub-model for advanced persistent threat (APT) domains, and a ninth additional sub-model for malware CnC sites. In supplemental embodiments, the ASN data traffic model includes one or more features selected from a group consisting of a count of the domains for a given ASN accessed by the endpoints, a count of IP addresses for a given ASN accessed by the endpoints, and a number of the endpoints accessing a given ASN.

There is also provided, in accordance with an embodiment of the present invention, and apparatus, including a memory, and a processor configured to collect information on data transmitted from multiple endpoints to multiple Internet sites having respective domains and respective Internet Protocol (IP) addresses, to identify, in the collected information, transmissions to IP addresses of autonomous system numbers (ASNs) or ASN names included in a list of ASNs, to generate an ASN data traffic model by modeling, for each given ASN, data transmitted to any of the IP address of the given ASN based on the collected information, for each given ASN, to perform, using a specified set of indicative keywords, a set of web searches, each of the web searches including a given indicative keyword and an ASN name or a number for the given ASN, to generate, based on the web searches, a web search model of relationships between the indicative keywords and the ASNs, and to predict one or more of the ASNs to be suspicious based on their respective modeled data transmissions and their respective modeled relationships between the indicative keywords and the one or more ASNs.

There is additionally provided, in accordance with an embodiment of the present invention, a computer software product, the product including a non-transitory computer-readable medium, in which program instructions are stored, which instructions, when read by a computer, cause the computer to collect information on data transmitted from multiple endpoints to multiple Internet sites having respective domains and respective Internet Protocol (IP) addresses, to identify, in the collected information, transmissions to IP addresses of autonomous system numbers (ASNs) or ASN names included in a list of ASNs, to generate an ASN data traffic model by modeling, for each given ASN, data transmitted to any of the IP address of the given ASN based on the collected information, for each given ASN, to perform, using a specified set of indicative keywords, a set of web searches, each of the web searches including a given indicative keyword and an ASN name or a number for the given ASN, to generate, based on the web searches, a web search model of relationships between the indicative keywords and the ASNs, and to predict one or more of the ASNs to be suspicious based on their respective modeled data transmissions and their respective modeled relationships between the indicative keywords and the one or more ASNs.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
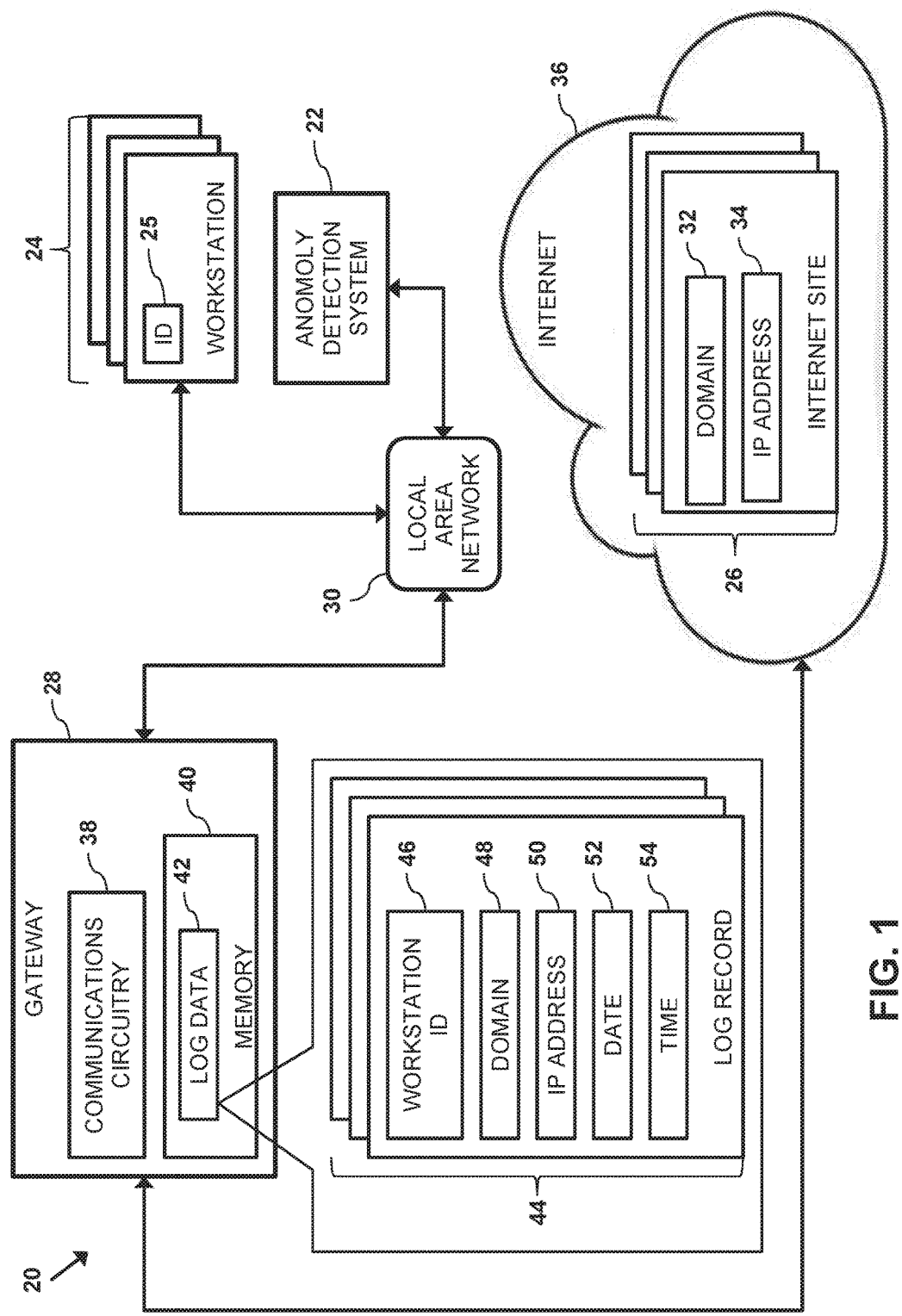
FIG. 1 is a block diagram that schematically shows a computing facility comprising an anomaly detection system that can identify Internet sites belonging to bulletproof autonomous systems, in accordance with an embodiment of the present invention.

Autonomous systems are respective collections of connected Internet Protocol (IP) addresses that are usually controlled by the same network operator. Each autonomous system (AS) has a corresponding autonomous system number (ASN). In embodiments described herein, a given autonomous system may be referred to by its corresponding autonomous system number.

ASNs are either rentable or non-rentable. A rentable ASN provides hosting services to others for a fee. For example, while some Internet based retailers are reliable companies that provide hosting services, there may be a malicious activity hosted on their sites (i.e., without the hosting company knowing it). On the other hand, other corporations (e.g., banks) may have ASNs but do not supply hosting services. While there may be malicious activity on these corporations' servers, (e.g., by someone who broke in) this possibility is low.

Therefore, identifying ASNs and their respective behaviors (i.e., rentable, non-rentable, malicious, benign) is typically important when managing security for a data network. In particular, some ASNs may provide bulletproof hosting, which is a service provided by some domain hosting or web hosting firms that allows their customer considerable leniency in the types of material they upload and distribute. Bulletproof hosting is typically more expensive than regular hosting. For this reason, people usually don't host their site "accidentally" at a bulletproof hosting service.

Web sites that are hosted by bulletproof hosting services can be used to provide illegal services such as phishing, infection and malicious Command and Control (CnC) channels. Therefore, it is useful for a network security system to be able to detect accesses to any web site hosted by a bulletproof hosting service.

Embodiments of the present invention provide methods and systems for detecting traffic originating from autonomous systems that can potentially comprise a corporate network. As described hereinbelow, information is collected from data transmitted from multiple endpoints (e.g., computers on a network) to multiple Internet sites having respective domains and respective Internet Protocol (IP) addresses, and transmissions to autonomous system numbers (ASNs) are identified from the collected information. As described hereinbelow, the information can be extracted from data packets collected from the network.

In embodiments of the present invention, the transmissions to ASNs can be identified by comparing the collected IP addresses to IP addresses of autonomous systems in a list of ASN IP addresses. Therefore, the identified transmissions are to a domain which is hosted on a server having an IP address belonging to a given ASN or a given ASN name (i.e., from an IP address in the list of ASN IP addresses).

In some embodiments, an ASN data traffic model can be generated by modeling for each given ASN, data transmitted to any of the IP addresses of the given ASN based on the collected information. The ASN data traffic model can be used to analyze information (i.e., features) such as:

A count of domains for the given ASN accessed by the endpoints.

A count of IP addresses for the given AS accessed by the endpoints.

A count of the endpoints accessing the given ASN.

Using a specified set of indicative keywords, a set of web searches for each given ASN is performed. Each of the web searches comprises a given indicative keyword and the ASN name or the ASN number for the given ASN, and the web searches generate, for the ASNs, a web search model of relationships between the indicative keywords and the given ASN name or the given ASN number. For example, the relationships may comprise respective counts of search results for the web searches of combinations of the ASN names and the indicative keywords.

Based on their respective modeled transmitted data (i.e., applying the data traffic model to the transmitted data) and their respective modeled relationships (i.e., from the web search model), one or more of the ASNs can be predicted (i.e., determined) to be suspicious, and an alert can be generated for the identified ASNs. As described hereinbelow, the prediction can be a result of a machine learning algorithm that given samples of bulletproof and non-bulletproof ASNs, can use bootstrapping to increase the number of indicative keywords used for the web searches. In embodiments using a machine learning algorithm, bulletproof ASNs can be predicted using a confidence level.

In some embodiments, the generated alert may comprise preventing unauthorized communications between the endpoints and the identified one or more ASNs. For example, an internet gateway (or a firewall) coupling the network to the Internet can be configured to block access to the IP addresses belonging to the one or more identified ASNs.

In some embodiments, a score can be used to predict the suspicious ASNs. For example, a score can be computed for each given ASN based on the following:

A number of the endpoints accessing the given ASN.

A number of the accessed IP addresses corresponding to the ASN that were accessed.

A number of the accessed domains corresponding to the ASN that were accessed.

A correlation between the indicative keywords and the given ASN.

Most ASNs are not malicious bulletproof ASNs. As described hereinbelow, in addition to detecting bulletproof ASNs, systems implementing embodiments of the present invention can be also used to detect rentable ASNs. A rentable ASN provides hosting services to others for a fee. For example, while Amazon Corporation (Seattle, Wash.) is a very reliable company that provides hosting services, there may be a malicious activity hosted on Amazon's services (i.e., without Amazon knowing it). On the other hand, other corporations (e.g., banks) may have ASNs but do not supply hosting services. While there may be malicious activity on these corporations' servers, (e.g., by someone who broke in) this possibility is low.

Using embodiments of the present invention to identify rentable ASNs can be useful, since all bulletproof ASNs are also rentable ASNs. Additionally, identifying non-rentable ASNs can be useful since fewer resources can be allocated to analyze transmissions to non-rentable ASNs. Therefore, in some embodiments, a first analysis of the collected information can first be performed to detect rentable ASNs, and a second analysis of the collected information that is limited to the rentable ASNs can then be performed to identify any bulletproof ASNs.

System Description

FIG. 1 is a block diagram that schematically shows a computing facility 20 comprising an anomaly detection system 22 that monitors transmissions from multiple workstations 24 (also referred to as endpoints) to multiple Internet sites 26 in order to determine if any of the Internet sites belong to bulletproof ASNs, in accordance with an embodiment of the present invention. Each workstation 24 comprises a workstation ID 25 such as a MAC address that can be used to uniquely identify each of the workstations.

Computing facility 20 also comprises an internet gateway 28, which is coupled, along with workstations 24, to a network 30, such as a local area network. Examples of workstations 24 include personal computers comprising respective central processing units, memories, and network interface controllers (not shown) which connect the computers to network 30. While the configuration in FIG. 1 shows anomaly detection system 22 and workstations 24 coupled to local area network 30, configurations where the anomaly detection system and the workstations are coupled to (and communicate over) any type of network (e.g., a wide area network or a data cloud) are considered to be within the spirit and scope of the present invention. In some embodiments, some or all of workstations 24 and anomaly detection system 22 may be deployed on network 30 as virtual machines.

Each Internet site 26 is typically hosted on a server having a given IP address 34, and the Internet site comprises a domain 32 that resolves (i.e., maps) to the given IP address 34. In embodiments described herein, the term domain may also refer to a domain name for a given domain.

Gateway 28 couples computing facility 20 to public networks 36 such as the Internet, and comprises communications circuitry 38 and a gateway memory 40 that are connected by a gateway bus (not shown). Communications circuitry 38 typically comprises a gateway processor and network circuitry (both not shown) that enable communication between workstations 24 and Internet sites 26.

In some embodiments, memory 40 stores log data 42 comprising log records 44 that include details of communications between workstations 24 and Internet sites 26. For example, in the configuration shown in FIG. 1, when a given workstation 24 having given workstation ID 25 accesses, on a given date at a given time, a given Internet site 26 having a given domain 32 and a given IP address 34, anomaly detection system 22 can add a new log record to log data 42, and store, to the new record, the given workstation ID to log workstation ID 46, the given domain to log domain 48, the given IP address to log IP address 50, the given date to log date 52, and the given time to log time 54.

Figure 2:
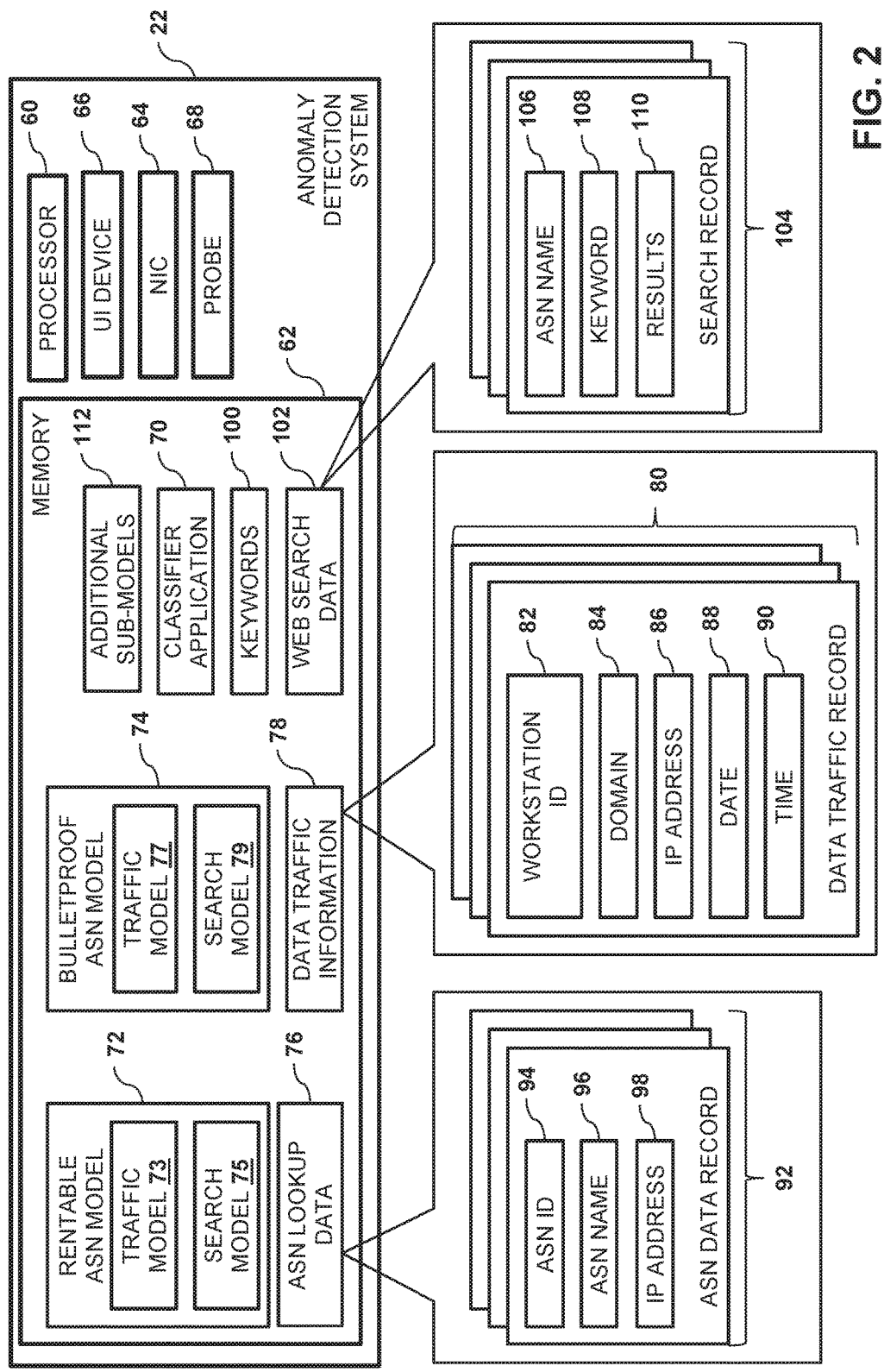
FIG. 2 is a block diagram of the anomaly detection system, in accordance with an embodiment of the present invention.

FIG. 2 is a block diagram of anomaly detection system 22, in accordance with an embodiment of the present invention. Anomaly detection system 22 comprises a system processor 60 and a system memory 62, which are connected by a system bus (not shown) to a network interface controller (NIC) 64 that couples the anomaly detection system to network 30. In some embodiments, anomaly detection system 22 may comprise a user interface (UI) device 66 (e.g., an LED display) or another type of output interface. Examples of memory 62 include dynamic random-access memories and non-volatile random-access memories. In some embodiments, memory 62 may include non-volatile storage devices such as hard disk drives and solid-state disk drives.

In the configuration shown in FIG. 2, anomaly detection system 22 comprises a probe 68 that collects information on data transmitted over network 30. While the example in FIG. 2 shows probe 68 as a module of anomaly detection system 22, the probe may be implemented as either a standalone device coupled to network 30 or as a module in another device coupled to the network. Using probe 68 to collect data packets from network 30 and processing the collected data packets to extract information is described, for example, in U.S. Patent Application 2014/0165207 to Engel et al. and U.S. Patent Application 2015/0358344 to Mumcuoglu et al., whose disclosures are Incorporated herein by reference.

Memory 62 stores a classifier application 70 comprising a classification algorithm, a rentable ASN model 72, a bulletproof ASN model 74, ASN lookup data 76 and data traffic information 78. In some embodiments, rentable ASN model 72 comprises a rentable ASN data traffic model 73 and a rentable ASN web search model 75, and bulletproof ASN model 74 comprises a bulletproof ASN data traffic model 77 and a bulletproof ASN web search model 79. The use of models 72, 73, 75, 77 and 79 is described hereinbelow. In some embodiments, memory 62 also stores additional sub-models 112, which are described in Appendix 1, hereinbelow.

As described supra, model 72 comprises models 73 and 75, and model 74 comprises models 77 and 79. Therefore, models 73, 75, 77 and 79 may also be referred to herein as sub-models. In some embodiments, as described hereinbelow in Appendix 1, models 72 and 74 may comprise other types of sub-models.

In embodiments of the present invention, models 73 and 75 can be used to analyze data traffic records 80 to determine information such as:

A count of domains 84 for a given ASN 94 accessed by the endpoints.

A count of IP addresses 98 for a given ASN 94 accessed by the endpoints.

A count of the endpoints accessing given ASN 94.

Data traffic information 78 comprises data traffic records 80 that store information on data transmitted from workstations 24 to Internet sites 26. Each data traffic record 80 comprises information such as an analysis workstation ID 82 (also referred to herein as a source 82), an analysis domain 84 (also referred to herein as a domain 84), an analysis IP address 86 (also referred to herein as an IP 86), an analysis date 88 and an analysis time 90.

In a first embodiment, processor 60 can collect information from network 30 by retrieving, for a specific time period (e.g., by selecting records 44 based on respective dates 52 and times 54), a plurality of log records 44 from gateway 28, and storing, to a corresponding plurality of data traffic records 80, log workstation ids 46 to respective analysis workstation ids 82, log domains 48 to respective analysis domains 84, log IP addresses 50 to respective analysis IP addresses 86, log dates 52 to analysis dates 88, and log times 54 to analysis times 90.

In a second embodiment, processor 60 can collect the information by using, during the specific time period, probe 68 to retrieve data packets from network 30 and extracting, from the data packets, data transmissions from workstations 24 to Internet sites 26. For each transmission collected by probe 68, processor 60 can add a new data traffic record 80, and store, to the added data traffic records, workstation ID 25 to respective analysis workstation ids 82, log domains 48 to respective analysis domains 84, log IP addresses 50 to respective analysis IP addresses 86, log dates 52 to analysis dates 88, and log times 54 to analysis times 90.

A domain can be mapped to an IP address by actively resolving it or by passively monitoring the resolving. Given the IP address, one can use ASN lookup data 76 in order to map an IP address to its ASN. ASN lookup data 76 data can be obtained, for example, from the Internet Assigned Numbers Authority (www.iana.org, Playa Vista, Calif.).

In some embodiments, there may be multiple records 92 for a given ASN ID 94 (i.e., since a given ASN 94 may have multiple IP addresses 98). For example, a given ASN ID 94 may have multiple ASN IP addresses 98. In embodiments herein, ASN ID 94 may also be referred to as ASN 94 (i.e., since they are both numbers).

In some embodiments, processor 60 may execute classifier application 70 comprising a classification algorithm that analyzes information in ASN data records 92 and data traffic records 80 to determine if a given Internet site 26 belongs to a rentable or a bulletproof ASN. As described hereinbelow, some embodiments of the present invention may bootstrap or co-train models 72 and 74. Examples of classification algorithms are Bayesian models, neural networks and random forests. As described hereinbelow, the classification algorithm can use model 72 to determine, based on information stored in records 80 and 92, if a given Internet site 26 belongs to a rentable ASN. Likewise, classification application 70 can use model 74 to determine, based on the information stored in records 80 and 92, if a given Internet site 26 belongs to a bulletproof ASN.

Memory 62 also stores indicative keywords 100 and web search data 102 that comprises multiple search records 104. Each of the search records comprises a search ASN name 106, a search keyword 108 and a search result 110 (e.g., a number of search results) that can provide information such as a number of returned pages for the search. Keywords 100 and search records 104 are described in the description referencing FIG. 3 hereinbelow.

Although anomaly detection system 22 is shown and described here for the sake of simplicity as a single, standalone unit, in practice the functions of the anomaly detection system may be integrated with other software-based functions in a single given workstation 24 and/or distributed over a group of workstations 24. In particular, anomaly detection system 22 may be integrated in a given workstation 24 that also monitors and investigates other types of security threats in computing facility 20. Such a computer may also, for example, perform the anomaly detection functions described in the above-mentioned U.S. Patent Application 2014/0165207 and/or the forensic functions described in the above-mentioned U.S. Patent Application 2015/0358344. In some embodiments, anomaly detection system 22 may be deployed in computing facility 20 as one or more virtual machines.

Processor 60 comprises a general-purpose central processing unit (CPU) or special-purpose embedded processors, which are programmed in software or firmware to carry out the functions described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processor 60 may be carried out by hard-wired or programmable digital logic circuits.

ASN Classification

Figure 3:
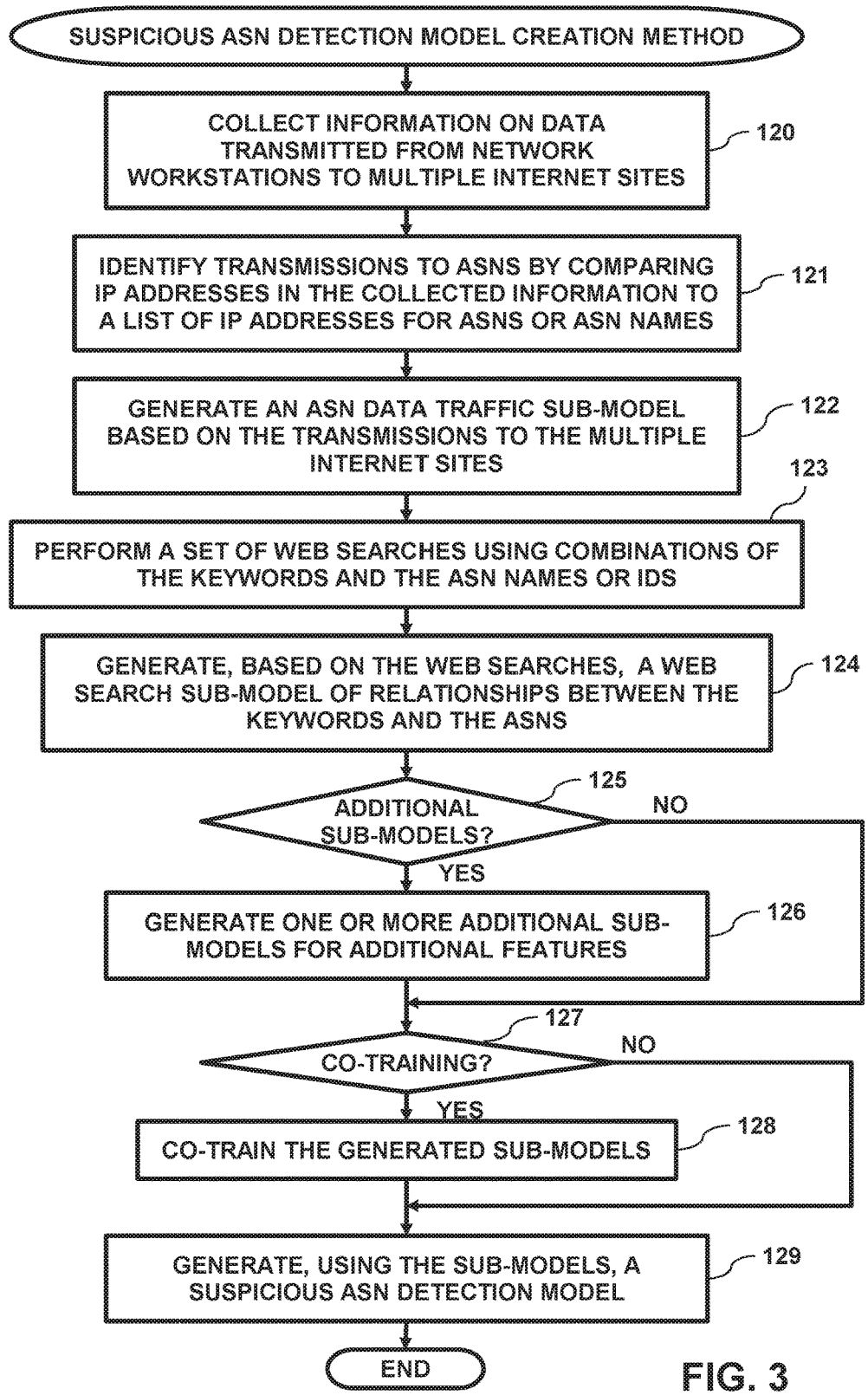
FIG. 3 is a flow diagram that schematically illustrates a method of creating a model to identify Internet sites belonging to bulletproof autonomous systems, in accordance with an embodiment of the present invention.

FIG. 3 is a flow diagram that schematically illustrates a method for generating model 74 to identify suspicious ASNs 94, in accordance with an embodiment of the present invention. In embodiments described herein, the term suspicious ASN refers to a bulletproof ASN or a rentable ASN. In some embodiments, processor 60 can first determine of a given domain 84 is rentable or not rentable. Since bulletproof ASNs must be a rentable ASN, determining that a given ASN is not rentable is a good indication that any domains for Internet sites having IP addresses hosted by non-rentable ASNs are benign.

In a collection step 120, processor 60 collects, during a training period, information on data transmitted from workstations 24 to Internet sites 26, and stores the collected information to data traffic records 80. Using embodiments described supra, processor 60 can collect the information from log data 42 or probe 68, and store the information to data traffic records 80. Embodiments of the present invention use the collected information to profile ASNs 94 and to identify any access to a bulletproof ASN.

In an identification step 121, processor 60 compares IP addresses 86 to IP addresses 98 in order to identify records 80 that correspond to transmissions from workstations 24 to Internet sites 26 belonging to ASNs 94 or ASN names 96. In other words, these identified records indicate network traffic from workstations 24 to Internet sites 26 belonging to ASNs.

In a first model generation step 122, processor 60 generates ASN data traffic model 77 (and/or model 73) based on the transmissions to IP addresses 98 (i.e., in the collected information). As described supra, the data traffic model can analyze data transmitted to ASNs 94 in order to identity types (e.g., retailers) of ASNs. Generating the sub-model is described hereinbelow in Appendix 1.

In a search step 123, processor 60 performs a set of web searches using combinations of ASN names 96 and keywords 100 (also referred to herein as indicative keywords) that are selected based on a goal of the search (i.e., searching for Internet sites 26 belonging to rentable or bulletproof ASNs), and in a relationship step 124, the processor can generate a model of relationship between the keywords and ASNs 94. In embodiments of the present invention, the relationship may comprise results 110 for the searches that can be used to determine if a given ASN 94 belongs to a rentable or a bulletproof ASN.

For each given search, processor 60 creates a new search record 104, and stores, to the new search record, a given ASN name 96 used in the given search to ASN name 106 and a given keyword 100 used in the search to keyword 108. Each given search generates a number of results that are stored to results 110 in records 104. In embodiments of the present invention, processor 60 can use the result counts to determine respective relationships between the keywords and the ASNs.

In some embodiments, processor 60 can submit the web searches and collect information on results of the searches via an application program interface (API) for a search engine such as Bing™ which is deployed by Microsoft Corporation, Redmond Wash.

In embodiments of the present invention, web searches are an important source of information regarding the ASNs. A large number in a given search results 110 for a given ASN name 106 can be a strong indicator that the corresponding ASN 94 is not bulletproof. On the other hand, positive values in the result count of a search comprising a given ASN name 106 with certain other keywords 108 (for example "bulletproof", "spam", "quota", "share", and "anonymous") can be a strong indicator that the corresponding ASN 94 is bulletproof. Given the search results, natural language processing (NLP) can be used in order to find indications of ASNs 94 being rentable or bulletproof. Examples can be grammatical patterns used to verify positive use. These patterns differ between sentences like "hosting should not be used for spam" and "we are agnostic to the hosting usage, spam mailing and the hosted content".

In a first decision step 125, if there are additional sub-models 112 (i.e., in addition to sub-models 73, 75, 77 and 79), then in a third model generation step 126, processor 60 generates one or more additional sub-models 112 for additional features, as described hereinbelow. In a second decision step 127, if co-training is desired, then processor 60 co-trains the generated sub-models in a co-training step 128. Co-training the sub-models is described in Appendix 3 hereinbelow.

Finally, processor 60 uses the sub-models to generate model (and/or models 72) in a fourth model generation step 129, and the method ends. Processor 60 can use the model generated is step 129 to classify a given ASN 94 as suspicious (e.g., rentable and/or bulletproof). Returning to step 127, if co-training is not desired, then the method continues with step 129. Returning to step 125, if there are no additional sub-models 112, then the method continues with step 127.

In some embodiments, generating the data traffic sub-model may comprise analyzing the collected data (e.g., using the classification algorithm in classifier application 70) to build model 74 (and/or model 72). For example, the analysis may provide weights that the models can use to apply to features (e.g., information in records 80) in the collected information in order to predict if a given domain 48 belongs to a bulletproof ASN.

Figure 4:
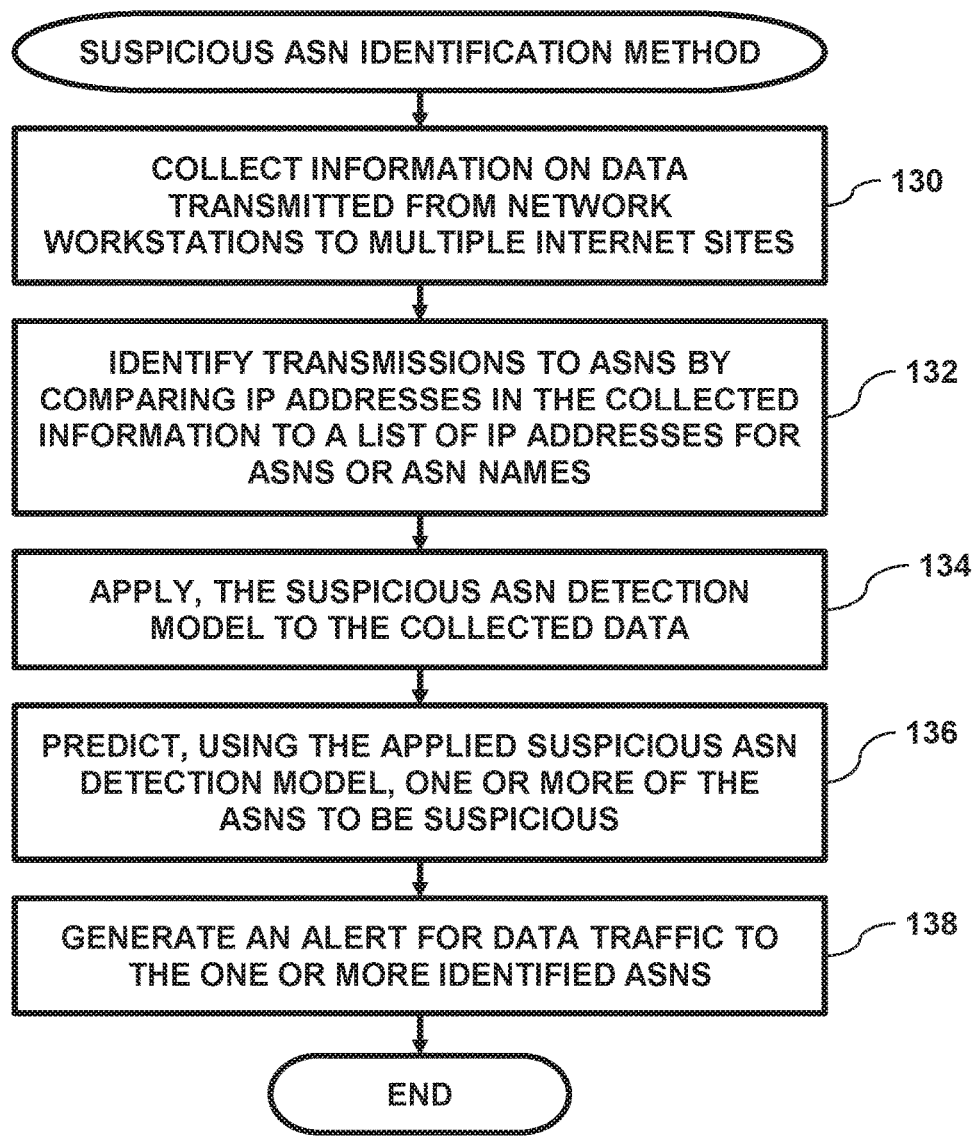
FIG. 4 is a flow diagram that schematically illustrates a method of using the model to identify Internet sites belonging to bulletproof autonomous systems, in accordance with an embodiment of the present invention.

FIG. 4 is a flow diagram that schematically illustrates a method of using model 74 to identify domains 84 of Internet sites 26 belonging to bulletproof autonomous systems, in accordance with an embodiment of the present invention. Using embodiments described supra, processor 60 collects, during a production period, information on data transmitted from workstations 24 to Internet sites 26 in a collection step 130, and in an identification step 132, the processor compares IP addresses 86 to IP addresses 98 in order to identify records 80 that correspond to transmissions from workstations 24 to Internet sites 26 belonging to ASNs.

In a model application step 134, processor 60 applies model (or model 72) to the collected information, and in a prediction step 136, model 4 predicts in one or more ASNs 94 to be suspicious. For example, processor 60 can apply the ASN data traffic sub-model (i.e., of model 72) by computing, for each given ASN 94, a count of domains 84 that correspond to respective IP addresses 86 belonging to the given ASN (i.e., IP addresses 86 matching IP addresses 98), a count of IP addresses 86 matching IP addresses 98, and a count of workstations 24 that accessed IP addresses 86 matching IP addresses 98.

As described supra, there can be different analyses of the web searches and the data traffic to identify Internet sites 26 belonging to rentable ASNs and bulletproof ASNs. Likewise, there may be separate score thresholds for identifying Internet sites 26 belonging to rentable and bulletproof ASNs.

In a first classification embodiment, processor 60 performs the prediction by executing model 74 to predict, based on a confidence score, if any of the domains are hosted by a bulletproof ASN. In a second classification embodiment, processor 60 can predict if any of the domains are being hosted by a bulletproof ASN by computing a score for each of the domains based on the applied model and the generated relationships, and identifying any of the scores are greater than a specified threshold.

In some embodiments the prediction (or the score) may be split into two predictions (or scores), a network traffic prediction (or a network traffic score) that uses the collected data applied to the ASN data traffic model and a web search prediction (or a web search score) that uses the relationships computed in response to the web searches. If the network prediction is performed first, processor 60 can limit the web searches used to perform the web search prediction, (or to compute the web search score) to ASNs filtered by the network traffic prediction (or whose respective network traffic scores exceed a network traffic score threshold) and generate an alert for Internet sites having domains 32 that map to IP addresses 34 belonging to any of the ASNs filtered by the web search prediction (or whose web search score is greater than a specified web search score threshold).

Likewise, if the web search prediction is performed first, processor 60 can limit the network traffic used to perform the network traffic prediction (i.e., compute the network traffic score) score to ASNs filtered by the web search prediction (or whose respective web search scores exceed a web search score threshold) and generate an alert for Internet sites having domains 32 that map to IP addresses 34 belonging to any of the ASNs filtered by the network traffic prediction (or whose network traffic score is greater than a specified network traffic score threshold).

In some embodiments, processor 60 can first perform, using model 76, the analysis described in FIGS. 3 and 4 on all data traffic records 80 in order to identify a plurality of ASNs 94 that are rentable. Processor 60 can then perform, using model 74, the analysis described in FIGS. 3 and 4 on the data traffic records that correspond to the identified rentable ASNs in order to identify a set of ASNs that are bulletproof. In other words, processor 60 can predict if a given ASN 94 is rentable and/or bulletproof.

Finally, in an alert step 138, processor 60 can generate an alert for the one or more identified ASNs, or for transmissions to the IP addresses of the one or more predicted ASNs, and the method ends. In a first embodiment, processor 60 can generate the alert by configuring gateway 28 to prevent unauthorized communication between workstations 24 and Internet sites 26 whose respective IP addresses 34 belong to the set of ASNs that were identified as bulletproof, and the method ends. In a second embodiment, processor 60 can generate the alert by presenting, to a system user on UI device 66, the identified bulletproof ASNs, and the system user can configure gateway 28 (or a network firewall) to restrict (e.g., prevent unauthorized communication) between workstations 24 and Internet sites 26 whose respective IP addresses 34 belong to the set of ASNs that were identified as bulletproof.

In some embodiments, processor 60 can use classifier application 70 to compute the scores or perform the predictions for records 80 comprising some labeled data (i.e., records) along with unlabeled data that is to be analyzed. One way to analyze the unlabeled data is called bootstrapping, in which the classifier trains itself. In bootstrapping, knowing which strings are informative with regard to a given concept is a question of domain knowledge. However, once you have some words or labeled samples, you can use bootstrapping. Strings can be extracted from the search result and the information gain can be computed. Strings with high information gain can be used to get new search results and thus identify new strings. One can continue this cycle, increasing the size of the results set (and introducing noise into the results) as long as it is beneficial.

In bootstrapping a supervised learning algorithm is first trained based on the labeled data only. This classifier is then applied to the unlabeled data to generate more labeled examples as input for the supervised learning algorithm. Generally only the labels the classifier is most confident of are added at each step. In this process, there is typically a tradeoff between the benefit of increasing the number of labeled samples and the cost of using mislabeled samples.

Appendix 1: Sub-Model Generation

In some embodiments, network traffic information from more than one computing facility 20 can be analyzed to generate the data traffic sub-model. The following table is an example of results from applying data traffic sub-model 77 (or 79):

| Computing Facility 20 | ASN 94 | Number of Domains 84 | Number of IPs 86 | Number of Sources 24 |
|---|---|---|---|---|
| Bank-A | 123 | 100 | 1,000 | 8,000 |
| Bank-A | 888 (seen only here) | 1 | 10,000 | 999 |
| Bank-B | 123 | 58 | 544 | 7,000 |
| Bank-B | 999 | 5 | 100 | 3 |

The first row comprises a typical profile for a rentable ASN. ASN "123" hosts many domains 86 and is quite popular among workstations 24 (also referred to herein as sources 24). Large Internet retailers may have this type of profile.

The second row indicates a private ASN that is not rentable. ASN "888" hosts a single domain 84 yet it is popular among sources 24. Examples of ASNs 94 that has a profile of this type include professional job-networking sites.

The third row comprises the same ASN "123" as the ASN in the first row. Columns 2-4 for this row are different since each computing facility is installed in a different customer's network that has its own traffic patterns.

In the fourth row, if ASN "999" is rentable, then it might be suspected as being bulletproof since only a few domains 84 are accessed, many IPs 86 are accessed (i.e., relative to the number of the accessed domains), and only a few sources 24 are accessing the domains/IPs.

In some embodiments, processor 60 can use features from the collected information, and model their relation to the concept. For example the following table shows relationships that indicate whether a given ASN 94 is reliable, rentable or bulletproof:

| ASN 94 | ASN Name 96 | Search for ASN Name 96 | Search for ASN Name 96 + "anonymous" | Search for ASN Name 96 + "hosting" | Search for ASN Name 96 + "privacy" |
|---|---|---|---|---|---|
| 123 | Hosting Co. #1 | 985,555 | 12 | 958,745 | 22 |
| 999 | Hosting Co. #2 | 20 | 15 | 7 | 9 |

For each row, the value in the third column of this table is the result count for a web search of the ASN name in the second column, the value in the fourth column of this table is the result count for a web search of the ASN name in the second column and the keyword "anonymous", the value in the fifth column of this table is the result count for a web search of the ASN name in the second column and the keyword "hosting", and the value in the sixth column of this table is the result count for a web search of the ASN name in the second column and the keyword "privacy". In this table, a high ratio value for a given search results 110 (i.e., the result count of a search for a given ASN name 96 divided by the result count of a search for a search of the given ASN name and a given keyword 108) for searches using keywords 100 such "hosting" (e.g., ASN "123" in the first row), "Virtual Private Server", "VPS" "bitcoin", "server", "dedicated server" is an indicator for a given ASN 94 being rentable, and high ratio values in the result counts for searches using the keywords "anonymous" or "privacy" (e.g., ASN "999" in the second row) is an indicator for a given ASN 94 being bulletproof.

As described supra, processor 60 can generate additional sub-models 112 (i.e., in addition to the data traffic and the web search sub-models). Other information that can be used includes a reputation (e.g., from a reputation source) for a given domain 84. Upon identifying a given ASN 94 hosting the Internet site having the given domain, processor 60 can use the reputation as a parameter when determining if the given ASN is bulletproof.

Examples of additional features that processor 60 can use for the additional sub-models 112 include:
  Blacklists for bulletproof ASNs, and whitelists for non-bulletproof ASNs. These lists can be used for manual labeling (e.g., for models 72 and 74). While the vast majority of ASNs are not labeled with criteria indicating rentable or bulletproof ASNs, some ASNs can be labeled using manual labeling. While blacklists are a less common source of bulletproof ASN identification, they are relatively reliable for the small number of ASNs that they can identify.
  Characteristics of ASN names 96. The ASN names can provide information regarding its respective properties. ASN names that include the word "University" typically have a lower probability of being rentable. On the other hand, ASN names 96 that include the word "telecommunication" typically have a higher probability of being rentable.
  Multiple ASNs 94. Greater geographical distances between workstations 24 and Internet sites 26 typically result in slower network traffic. Therefore, companies such as Alphabet Inc. (Mountain View, Calif.) typically host in many locations despite the extra cost. However, since the needs of cyber criminals are different, they tend to use a single ASN 94. Therefore finding a given domain 84 that belongs to (i.e., is associated with) multiple ASNs 94 is an indicator that the domain is probably benign. That in turn can be an indication that the ASNs of the domain are also benign. The intuition behind this logic is that companies like Alphabet typically do not use bulletproof hosting.
  Threat intelligence data. Threat intelligence sources such as Virus Total (Dublin, Ireland—a division of Alphabet Inc.) supply information regarding domains and IP addresses. Combining this information with the network traffic information (i.e., features) described supra enables computation of additional features such as a ratio of domains known as malicious, a ratio of domains known as benign, etc.
  Further examples of features, include, but are not limited to DCMA violation domains, adult site domain, APT domains, and malware CnC sites.

Appendix 2: Co-Training

Co-Training is an extension of bootstrapping (described supra), in which there is more than one classifier model used to classify data. This way the classifiers can provide labelled samples to each other, reducing the probability of self-bias and errors in labeling.

Co-training is an algorithm in the framework of semi-supervised learning, which begins from a small number of labeled samples and many unlabeled samples. The more labeled data that is available, the better the classifiers perform. The goal of co-training is to increase the number of labeled samples.

Co-training uses two independent learners, each using a different view of (i.e., a classification model for) the data. Examples of classification models (also referred to herein as sub-models) include models for network traffic, web search results, blacklists, names of the ASNs, threat intelligence data and a number of ASNs 94 associated with a given domain 84. In one embodiment, one or more of the sub-models (i.e., learners) can be used to identify ASN properties. In another embodiment, two or more sub-models can be co-trained, and the co-trained sub-models can be used to identify ASN properties. The predictions of one learner are used in order to teach the other learner in a cyclic manner (i.e., in each round each of the learners outputs an updated model). This way each learner gets a larger number of labeled samples that enable it to reach better predictions.

The goal of the method is to use co-training in order to better identify ASN properties. This can be done by using datasets from different sources (e.g., network traffic, threat intelligence sources, web site references to the AS) in order to get independent classifiers that can be used in co-training.

Figure 5:
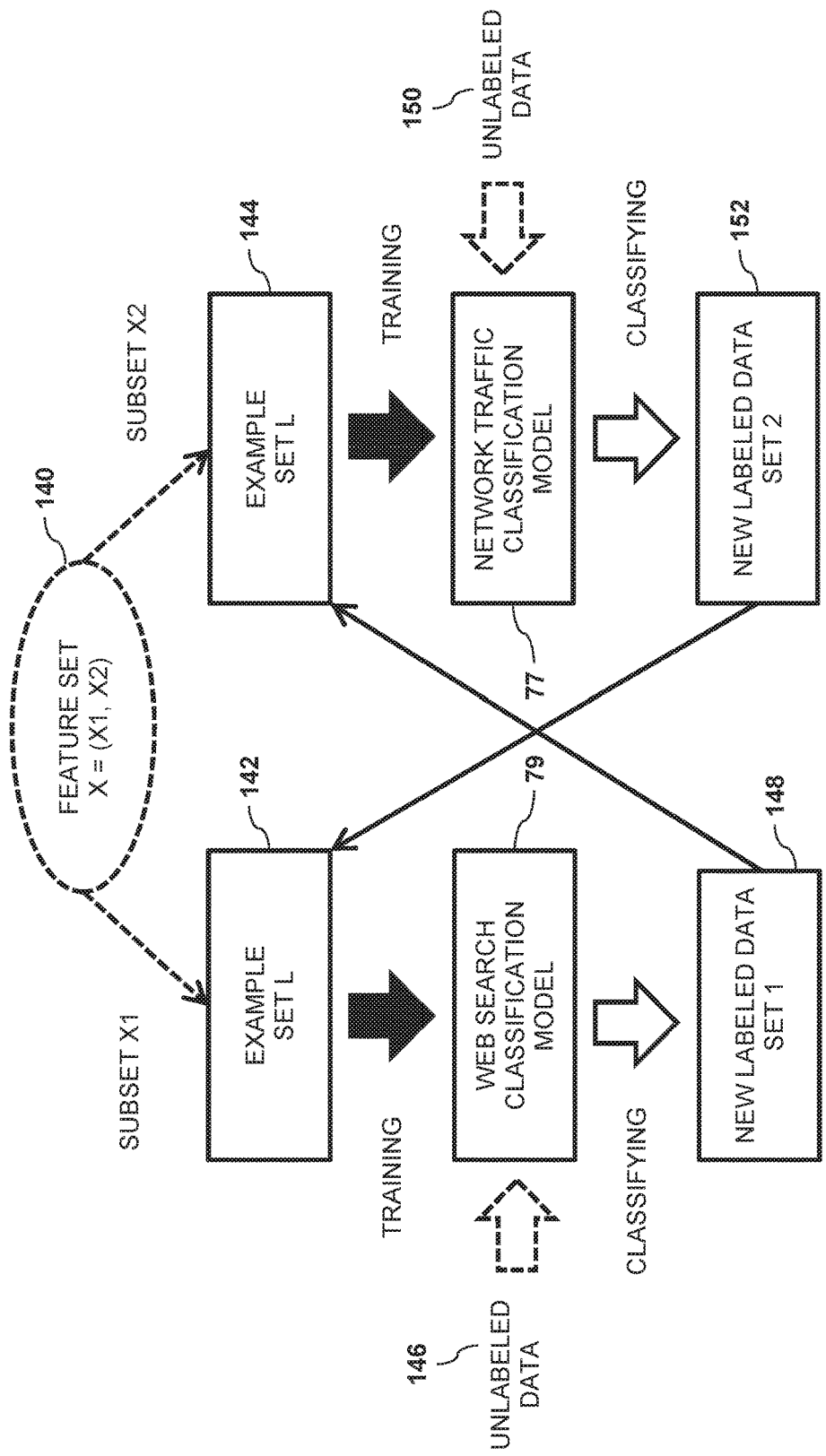
FIG. 5 is a block diagram that schematically illustrates co-training two classifiers to identify Internet sites belonging to bulletproof autonomous systems, in accordance with an embodiment of the present invention.

FIG. 5 is a block diagram that schematically illustrates an example of using co-training to train network traffic model and web search model 79 of bulletproof ASN model 74, in accordance with an embodiment of the present invention. The diagram presented in FIG. 5 is an adaptation of the co-training algorithm from "Blum, A., Mitchell, T., Combining labeled and unlabeled data with co-training. COLT: Proceedings of the Workshop on Computational Learning Theory, Morgan Kaufmann, 1998, p. 92-100." While FIG. 5 shows an example of co-training sub-models 77 and 79, co-training two or more of any sub-models 73, 75, 77, 79, and additional sub-models 112 is considered to be within the spirit and scope of the present invention While the description hereinbelow describes using co-training to train models 77 and 79 that are used to determine if a given ASN 94 is bulletproof, the same process can be used to train models 73 and 75 to determine if a given ASN 94 is rentable. Additionally, embodiments of the present invention can use bootstrapping to co-train any combination of two or more generated sub-models (i.e., the ASN data traffic sub-model, the web search sub-model, and other types sub-models, as described in the examples presented in Appendix 1)

Processor 60 uses a set of a feature set 140 that comprises labeled data for models 77 and 79. Feature set 140 comprises a set of ASNs 94 that may be labeled (e.g., manually). Feature set 140 comprises a subset 142 comprising ASNs with features based on web searches (i.e., data in records 104), and a subset 144 comprising ASNs with features based on network traffic (i.e., data in records 80). Web search classification algorithm accepts subset 142 and a set 146 of unlabeled ASNs 94 as inputs, and performs a fitting and classification to generate a new labeled data set 148, which processor 60 uses to update subset 144. Network traffic classification algorithm 77 accepts subset 142 and a set 150 of unlabeled ASNs 94 as inputs, and performs a fitting and classification to generate a new labeled data set 152, which processor 60 uses to update subset 142, and the training process is repeated until the models 77 and 79 are trained, as described in Appendix 3 hereinbelow.

Appendix 3: Sample Algorithm

Input:
L, initial set of labeled samples
U, a set of unlabeled samples
C, a set of n classifiers
Output:
$U, \ldots, U_n$, labeled samples from the originally unlabeled samples U
$M, \ldots, M_n$, models
Steps:
For any classifier $C_i \in C$
   set the dataset $L_i = L$
While not stop_condition
   Learn a model $M_i$ on $L_i$
   Compute $U_i$, the predictions of $M_i$ on U
   For any classifier $C_i \in C$
      $L_i = \text{merge}(L, U, \ldots U_{i-1}, U_{i+1}, U_n)$
Return $U, \ldots, U_n, M, \ldots, M_n$ There are many variants of the algorithm based on the logic of the stop_condition and merge functions. Possible implementations are:
Stop_condition:
Number of rounds<x
Number of labeled samples<y
Number of added labeled samples<z
Merge:
Take all the samples with confidence>x and do a majority vote
Take all the samples with confidence>y on which all classifiers agree
Use weight for all classifiers and take those whose aggregated confidence>z It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
collecting information on data transmitted from multiple endpoints to multiple Internet sites having respective domains and respective Internet Protocol (IP) addresses;
identifying, in the collected information, transmissions to IP addresses of autonomous system numbers (ASNs) or ASN names included in a list of ASNs;
generating an ASN data traffic model by modeling, for each given ASN, data transmitted to any of the IP address of the given ASN based on the collected information, wherein the data traffic model comprises a data traffic sub-model;
for each given ASN, performing, using a specified set of indicative keywords, a set of web searches, each of the web searches comprising a given indicative keyword and an ASN name or a number for the given ASN;
generating, based on the web searches, a web search model of relationships between the indicative keywords and the ASNs, wherein the web search model comprises a web search sub-model;
predicting one or more of the ASNs to be suspicious based on their respective modeled data transmissions and their respective modeled relationships between the indicative keywords and the one or more ASNs; and
generating, using the sub-models, a suspicious ASN detection model, wherein predicting one or more of the ASNs to be suspicious comprises applying the ASN detection model to the data transmission and the web searches.

2. The method according to claim 1, and comprising generating an alert for the one or more predicted ASNs, or for transmissions to the IP addresses of the one or more predicted ASNs.

3. The method according to claim 2 wherein generating the alert comprises restricting data transmissions between the endpoints and the IP addresses of the one or more predicted ASNs.

4. The method according to claim 1, wherein each given predicted ASN comprises a rentable ASN or a bulletproof ASN.

5. The method according to claim 1, wherein predicting a given ASN to be suspicious comprises calculating a score based on the modeled data traffic exchanged with the given ASN and the relationship between the indicative keywords and the given ASN, and detecting that the score is greater than a specified score threshold.

6. The method according to claim 1, wherein predicting the one or more ASNs to be suspicious comprises identifying a plurality of the ASNs based on the modeled data transmitted to the ASNs, and predicting, from the identified plurality of the ASNs, the one or more ASNs based on their respective generated model of relationship.

7. The method according to claim 1, wherein predicting the one or more ASNs to be suspicious comprises identifying a plurality of the ASNs based on their respective generated model of relationship, and predicting, from the identified plurality of the ASNs, the one or more ASNs based on the modeled data transmitted to the ASNs.

8. The method according to claim 1, wherein generating the suspicious ASN detection model comprises co-training the sub-models.

9. The method according to claim 1, and comprising generating one or more additional sub-models based on respective features, wherein the suspicious ASN detection model comprises the additional sub-models.

10. The method according to claim 9, wherein generating the suspicious ASN detection model comprises co-training the sub-models.

11. The method according to claim 9, wherein each of the one or more additional sub-models are selected from a group consisting of a first additional sub-model that analyzes respective reputations of the domains, a second additional sub-model that compares the domains to a blacklist, a third additional sub-model that uses threat intelligence data to analyze the domains, a fourth additional sub-model that analyzes a number of ASNs associated with each of the domains, a fifth additional sub-model that analyzes ASN names of the ASNs associated with the domains, a sixth additional sub-model for DCMA violation domains, a seventh additional sub-model for adult site domains, an eighth additional sub-model for advanced persistent threat (APT) domains, and a ninth additional sub-model for malware CnC sites.

12. The method according to claim 1, wherein the ASN data traffic model comprises one or more features selected from a group consisting of a count of the domains for a given ASN accessed by the endpoints, a count of IP addresses for a given ASN accessed by the endpoints, and a number of the endpoints accessing a given ASN.

13. An apparatus, comprising:
a memory; and
a processor configured:
to collect information on data transmitted from multiple endpoints to multiple Internet sites having respective domains and respective Internet Protocol (IP) addresses;
to identify, in the collected information, transmissions to IP addresses of autonomous system numbers (ASNs) or ASN names included in a list of ASNs,
to generate an ASN data traffic model by modeling, for each given ASN, data transmitted to any of the IP address of the given ASN based on the collected information, wherein the data traffic model comprises a data traffic sub-model,
for each given ASN, to perform, using a specified set of indicative keywords, a set of web searches, each of the web searches comprising a given indicative keyword and an ASN name or a number for the given ASN,
to generate, based on the web searches, a web search model of relationships between the indicative keywords and the ASNs, wherein the web search model comprises a web search sub-model,
to predict one or more of the ASNs to be suspicious based on their respective modeled data transmissions and their respective modeled relationships between the indicative keywords and the one or more ASNs, and
to generate, using the sub-models, a suspicious ASN detection model, wherein the processor is configured to predict one or more of the ASNs to be suspicious by applying the ASN detection model to the data transmission and the web searches.

14. The apparatus according to claim 13, wherein the processor is configured to generate an alert for the one or more predicted ASNs, or for transmissions to the IP addresses of the one or more predicted ASNs.

15. The apparatus according to claim 14, wherein the processor is configured to generate the alert by restricting data transmissions between the endpoints and the IP addresses of the one or more predicted ASNs.

16. The apparatus according to claim 13, wherein each given predicted ASN comprises a rentable ASN or a bulletproof ASN.

17. The apparatus according to claim 13, wherein the processor is configured to predict a given ASN to be suspicious by calculating a score based on the modeled data traffic exchanged with the given ASN and the relationship between the indicative keywords and the given ASN, and detecting that the score is greater than a specified score threshold.

18. The apparatus according to claim 13, wherein the processor is configured to predict the one or more ASNs to be suspicious by identifying a plurality of the ASNs based on the modeled data transmitted to the ASNs, and predicting, from the identified plurality of the ASNs, the one or more ASNs based on their respective generated model of relationship.

19. The apparatus according to claim 13, wherein the processor is configured to predict the one or more ASNs to be suspicious by identifying a plurality of the ASNs based on their respective generated model of relationship, and predicting, from the identified plurality of the ASNs, the one or more ASNs based on the modeled data transmitted to the ASNs.

20. The apparatus according to claim 13, wherein the processor is configured to generate the suspicious ASN detection model by co-training the sub-models.

21. The apparatus according to claim 13, wherein the processor is configured to generate one or more additional sub-models based on respective features, wherein the suspicious ASN detection model comprises the additional sub-models.

22. The apparatus according to claim 21, wherein the processor is configured to generate the suspicious ASN detection model by co-training the sub-models.

23. The apparatus according to claim 13, wherein each of the one or more additional sub-models are selected from a group consisting of a first additional sub-model that analyzes respective reputations of the domains, a second additional sub-model that compares the domains to a blacklist, a third additional sub-model that uses threat intelligence data to analyze the domains, a fourth additional sub-model that analyzes a number of ASNs associated with each of the domains, a fifth additional sub-model that analyzes ASN names of the ASNs associated with the domains, a sixth additional sub-model for DCMA violation domains, a seventh additional sub-model for adult site domains, an eighth additional sub-model for advanced persistent threat (APT) domains, and a ninth additional sub-model for malware CnC sites.

24. The apparatus according to claim 13, wherein the ASN data traffic model comprises one or more features selected from a group consisting of a count of the domains for a given ASN accessed by the endpoints, a count of IP addresses for a given ASN accessed by the endpoints, and a number of the endpoints accessing a given ASN.

25. A computer software product, the product comprising a non-transitory computer-readable medium, in which program instructions are stored, which instructions, when read by a computer, cause the computer:
to collect information on data transmitted from multiple endpoints to multiple Internet sites having respective domains and respective Internet Protocol (IP) addresses;

to identify, in the collected information, transmissions to IP addresses of autonomous system numbers (ASNs) or ASN names included in a list of ASNs;

to generate an ASN data traffic model by modeling, for each given ASN, data transmitted to any of the IP address of the given ASN based on the collected information, wherein the data traffic model comprises a data traffic sub-model;

for each given ASN, to perform, using a specified set of indicative keywords, a set of web searches, each of the web searches comprising a given indicative keyword and an ASN name or a number for the given ASN;

to generate, based on the web searches, a web search model of relationships between the indicative keywords and the ASNs, wherein the web search model comprises a web search sub-model;

to predict one or more of the ASNs to be suspicious based on their respective modeled data transmissions and their respective modeled relationships between the indicative keywords and the one or more ASNs; and to generate, using the sub-models, a suspicious ASN detection model, wherein the instructions cause the computer to predict one or more of the ASNs to be suspicious by applying the ASN detection model to the data transmission and the web searches.

* * * * *